United States Patent
Ferlitsch

(10) Patent No.: US 7,843,586 B2
(45) Date of Patent: Nov. 30, 2010

(54) SYSTEMS AND METHODS FOR FACILITATING DIRECT SCANNING TO NETWORK DESTINATIONS BY CLIENTS

(75) Inventor: Andrew R. Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1098 days.

(21) Appl. No.: 11/536,572

(22) Filed: Sep. 28, 2006

(65) Prior Publication Data
US 2008/0079985 A1 Apr. 3, 2008

(51) Int. Cl.
G06F 3/12 (2006.01)
(52) U.S. Cl. ............... 358/1.15; 358/1.13; 358/1.14; 709/203; 709/219
(58) Field of Classification Search ....... 358/1.13–1.15; 709/203, 219
See application file for complete search history.

(56) References Cited

U.S. PATENT DOCUMENTS

| | | | |
|---|---|---|---|
| 5,768,483 A | 6/1998 | Maniwa et al. | |
| 6,248,966 B1 | 6/2001 | Nakase et al. | |
| 6,289,371 B1 | 9/2001 | Kumpf et al. | |
| 6,425,001 B2 | 7/2002 | Lo et al. | |
| 6,459,499 B1 | 10/2002 | Tomat | |
| 6,535,914 B1 | 3/2003 | Pearson et al. | |
| 2002/0024685 A1 | 2/2002 | Sasaki et al. | |
| 2002/0085244 A1 | 7/2002 | Blasio et al. | |
| 2003/0046445 A1 | 3/2003 | Witt et al. | |
| 2003/0117664 A1 | 6/2003 | McCarthy, Jr. | |
| 2004/0150854 A1* | 8/2004 | Sprague et al. | 358/1.15 |
| 2004/0261084 A1 | 12/2004 | Rosenbloom et al. | |

FOREIGN PATENT DOCUMENTS

| | | |
|---|---|---|
| EP | 1 096 775 | 5/2001 |
| EP | 1 289 252 | 3/2003 |
| JP | 10-224534 | 8/1998 |
| JP | 11-177754 | 7/1999 |
| JP | 11-177784 | 7/1999 |
| JP | 2001217980 | 8/2001 |
| JP | 2001274943 | 10/2001 |
| JP | 2002024054 | 1/2002 |

* cited by examiner

Primary Examiner—Chan S Park
(74) Attorney, Agent, or Firm—Austin Rapp & Hardman

(57) ABSTRACT

In an exemplary embodiment, a scan destination profile request may be received. The scan destination profile request may include scanner-side settings. It may be determined whether the scanner-side settings are supported by a scanner. If it is determined that at least some of the scanner-side settings are not supported by the scanner, a scan destination profile may be split into a first part and a second part. The first part of the scan destination profile may include the scanner-side settings that are supported by the scanner. The second part of the scan destination profile may include the scanner-side settings that are not supported by the scanner. The first part of the scan destination profile may be uploaded to the scanner.

18 Claims, 11 Drawing Sheets

SYSTEMS AND METHODS FOR FACILITATING DIRECT SCANNING TO NETWORK DESTINATIONS BY CLIENTS

TECHNICAL FIELD

The present invention relates generally to computers and computer-related technology. More specifically, the present invention relates to systems and methods for facilitating direct scanning to network destinations by clients.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

A scanner is a device that may be used in connection with one or more computing devices. In typical operation, a scanner analyzes an image (such as a photograph, printed text, or handwriting) and converts it to a digital image. The processing of scanning may involve moving a light-sensitive device across an image-bearing surface (such as a page of text), converting the light and dark areas on the surface to binary digits that can be interpreted by computer. Scanners may also analyze other surfaces, such as non-linear surfaces, electronic data (e.g., microscopic), radio and telemetric data, auditory and visual information, etc.

Different kinds of computer software facilitate the use of scanning devices. The computer or computing device that is used to scan the materials may have one or more pieces of software running on the computer that enable it to send the necessary information to the scanning device to enable the materials to be scanned. If the computer or computing device is on a computer network there may be one or more pieces of software running on one or more computers on the computer network that facilitate scanning.

A variety of multi-function peripheral (MFP) devices and standalone scanners support direct scanning to a network-connected client. A growing number of these devices also support some form of automated post-processing workflow (e.g., OCR, index, Bates stamping, 3D simulation, etc.) on the scan data as part of the scan operation. Benefits may be realized by providing increased functionality to the software used in facilitating direct scanning to a network-connected client.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
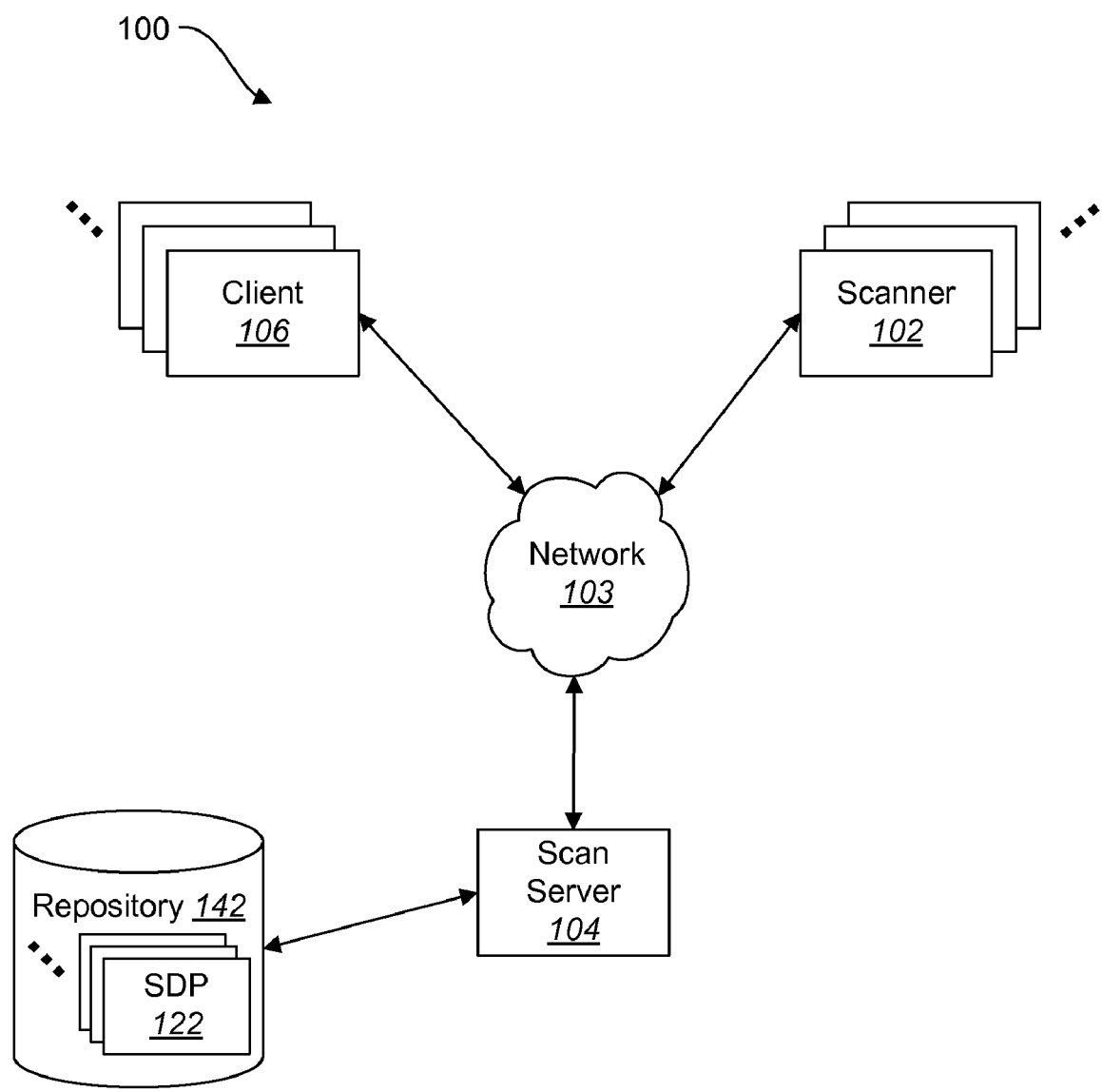
FIG. 1 illustrates an exemplary system in which embodiments may be practiced.

A method for facilitating direct scanning to network destinations by clients is disclosed. The method may be implemented by a scan server. In accordance with an embodiment, a scan server may receive a scan destination information request from a scan destination profile application on a client destination. The scan destination information request may include a scanner selection. Alternatively, the scan destination information request may not include a scanner selection, and the scan server may perform a best-fit search to determine one or more candidate scanners. The scan server may generate a user interface definition for scanner independent scan destination profile settings. The scan server may send the user interface definition to the scan destination profile application.

The scan server may receive a scan destination profile request. The scan destination profile request may include scanner-side settings. The scan server may determine whether the scanner-side settings are supported by a scanner. The scanner may be specified in the scan destination profile request. Determining whether the scanner-side settings are supported by the scanner may involve querying the scanner. Alternatively, or in addition, determining whether the scanner-side settings are supported by the scanner may involve querying a scanner model definition database.

The scan destination profile request may include destination-side settings. The scan server may determine whether the destination-side settings are supported by a client destination. This may involve querying the client destination. Alternatively, or in addition, this may involve querying a destination information repository.

If the scan server determines that at least some of the scanner-side settings are not supported by the scanner, the scan server may split a scan destination profile into a first part and a second part. The first part of the scan destination profile may include the scanner-side settings that are supported by the scanner. The scan server may be set as an output destination of the first part of the scan destination profile. Alternatively, another computing device that supports the scanner-side settings in the second part of the scan destination profile may be set as an output destination of the first part of the scan destination profile. The scan server may convert the first part of the scan destination profile from a scanner independent format into a format that is compatible with the scanner. The scan server may upload the first part of the scan destination profile to the scanner.

The second part of the scan destination profile may include the scanner-side settings that are not supported by the scanner. The second part of the scan destination profile may also include the destination-side settings that are not supported by the client destination. The scan server may convert the second part of the scan destination profile from a scanner independent format into a format that is compatible with the scan server. The scan server may save the second part of the scan destination profile in a scan destination profile repository.

The scan server may receive partially processed scan data from the scanner. The partially processed scan data may have been processed according to the first part of the scan destination profile. The scan server may perform additional processing on the partially processed scan data according to the second part of the scan destination profile, thereby generating scan server-processed scan data. The scan server may send the scan server-processed scan data to a client destination.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments of the disclosed invention(s)," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

In accordance with one method of implementing a network scan, a user may walk up to an MFP and initiate an ad-hoc scan (i.e., without a prior destination profile specified) to a network destination. From the device's front panel, the user may select either a destination and delivery method, such as email or FTP, and the output format, and file compression.

In accordance with another method of implementing a network scan, a user may predefine a scan destination profile from a client device and upload it to the MFP using an embedded web page in the MFP. This web page may allow the user to preset the same options that the user would have manually entered into the device in the previous method. The user may then subsequently repetitively scan to the same destination/options by selecting the predefined output destination profile on the device.

In accordance with another method of implementing a network scan, a scan server may be used to hold the scan destination profiles. In this method, instead of sending the scan destination profiles to each network scanner, the user may upload the scan destination profile(s) to a scan server. When a user walks up to a network scanner and selects a scan destination profile, the network scanner may retrieve the scan destination profiles from the common repository on the scan server.

In accordance with one method of specifying a post-processing workflow on the scan image data as part of the scan process, a user may create a scan destination profile. The user may additionally specify workflow operations (e.g., OCR) that are supported on the destination side, or intermediate destination (e.g., scan server). Each workflow specified may have a unique identifier (GUID), which may be included as part of the scan destination profile. When the user scans a document using the scan destination profile, the GUID corresponding to the workflow may be sent with the scanned image data to the destination. Upon receipt, the destination may execute the post-processing workflow, specified by the GUID, on the scanned image data.

One of the problems with using a network scanning utility with a workflow is that the user may be limited to scanned output formats that are native to both the scanner and destination, and automated workflows that are native to either the scanner or the destination host. For example, if the output format is not supported by the scanner, the user may not be able to set up a scan destination profile to receive the scanned image data in a format that is desired or supported by a host side post-processing service. Additionally, if the workflow is not supported by the scanner or receiving destination, the user may not be able to create a scan destination with the desired outcome.

With conventional approaches the user may be required to know which formats are or are not supported by the scanner. For the unsupported formats, it may be necessary to use an application that converts the scanner's outputted format into the desired format. For the unsupported workflows on the scanner or client, it may be necessary to find (e.g., manually) a service on another device to perform the workflow.

Embodiments disclosed herein relate generally to systems and methods in which a thin client (e.g., a client without scan workflows or applications for converting scan data formats) may be able to directly scan to a network destination in a variety of output formats. The systems and methods disclosed herein may also enable a thin client to utilize a variety of different workflows while directly scanning to a network destination. In accordance with some embodiments it is not necessary for the user to have knowledge of which output formats are native to the scanner. Additionally, it is not necessary for the thin client to include an application that supports converting the output format to a desired format. Moreover, it is not necessary for the thin client to include a workflow process that supports the workflow processes that are not native to the scanner. In accordance with some embodiments, when a user initiates a peer-to-peer network scan to a destination, where the workflow is native to either the client or the scanner, the document/image data may be sent directly from the scanner, without the document/data being transferred to an intermediate node (e.g., a network scan server) first.

An exemplary operating environment may include one or more network connected scanners or MFPs with network scanning capabilities, which may be network-connected or remotely-connected, and which may be capable of sending scanned image data to a network destination. An exemplary operating environment may also include a scan server, which may perform any well-known scan server operation, such as providing a repository for scan destination profiles. An exemplary operating environment may also include one or more client destinations, each running a direct scan utility for directly receiving scanned image data from the network connected scanners/MFPs.

In accordance with an embodiment, a user may initiate the construction and loading of a scan destination profile on one or more network connected scanner devices (or MFPs) and/or scan servers. This may involve three steps. In the first step, a scan destination profile (SDP) application may initiate the process by sending a scan destination information request to a scan server. After receiving the scan destination information request, the scan server may identify (or construct) a definition of a scanner independent scan destination profile settings user interface (UI). The scan destination profile settings UI definition may then be sent back to the SDP application. The settings may include selected scanner(s) or scanner group(s), scanner settings (e.g., resolution, image size), output formats (e.g., file type, compression, encoding, encryption), post-processing workflows (e.g., OCR, indexing, Bates stamping, 3D reconstruction), etc.

In the second step, the SDP application may generate and display a scan destination profile settings dialog from the received scan destination profile settings UI. After the user has entered his/her scan destination profile selections, the SDP application may then send a scan destination profile request message to the scan server. After receiving the scan destination profile request message, the scan server may retain the scan destination profile on the scan server in a scanner independent format.

The scan destination profile may then either be immediately pushed to the specified scanner(s), or pulled later (i.e., deferred) by a request from the scanner(s). When the scanner independent scan destination profile is pushed, or pulled, to the scanner, the scan server may determine if all the settings are native to (e.g., supported by) the specified scanner and/or destination. If so, the scan server may convert the scanner independent scan destination profile into a format that is compatible with the specified scanner, and upload the converted profile to the scanner. When a user subsequently selects the scan destination profile, the scanned image data may be processed natively on the scanner and sent directly (i.e., without going through the scan server) to the destination, where it may be further processed (i.e., workflow).

If the scan server determines that the scanner independent scan destination profile settings are not native to the selected scanner, then the scan server may construct a scan destination profile and then split the scan destination profile into two profiles. The first profile may include the scan destination profile settings that are native to the scanner, and the second profile may include the non-native scan destination profile settings.

The first profile may then be converted to a format that is compatible with the specified scanner, with the exception that the output destination of the first profile may be set to the scan server. The converted first scan destination profile may then be uploaded to the specified scanner. The second profile may then be converted to a format that is interpretable by the scan server (if it is not already in such a format), with the output destination of the second profile being set to the original output destination.

When a user subsequently selects the scan destination profile, the scanned image data may be partially processed natively on the scanner according to the first profile and then sent to the scan server. The scan server may then continue the processing of the scanned image data according to the second profile and send the processed scanned image data to the original destination, where it may be further processed by a destination native workflow process.

FIG. 1 illustrates an exemplary operating environment 100 in which embodiments may be practiced. The exemplary operating environment 100 may include one or more network-connected scanners 102. The scanners 102 may be connected to a network 103 and/or remotely connected, and may be capable of sending scanned image data to a destination on the network 103. The scanners 102 may be multi-function peripherals (MFPs) with network scanning capabilities. Some other examples of network-connected scanners 102 include a document scanner, a facsimile device, an electronic whiteboard, a filing device, a digital still or video camera, a video cell phone, a barcode scanner, an X-ray, MRI, cat-scan or other medical imaging device, etc.

The exemplary operating environment 100 may also include a scan server 104, which may perform any well-known scan server operation, such as providing a repository 142 for scan destination profiles 122. The scan server 104 may be any type of computing device, such as a server PC, a workstation PC, an imaging device (e.g., an MFP), etc.

The exemplary operating environment 100 may also include one or more client destinations 106. The client destinations 106 may each be running a direct scan utility for directly receiving scanned image data from the network connected scanners/MFPs 102. Communication between the network-connected scanners 102 and the destination clients 106 may be over any communication channel, such as email, FTP, HTTP/DIME, SOAP/XML, a proprietary protocol over TCP/IP, AppleTalk, etc.

Figure 2A:
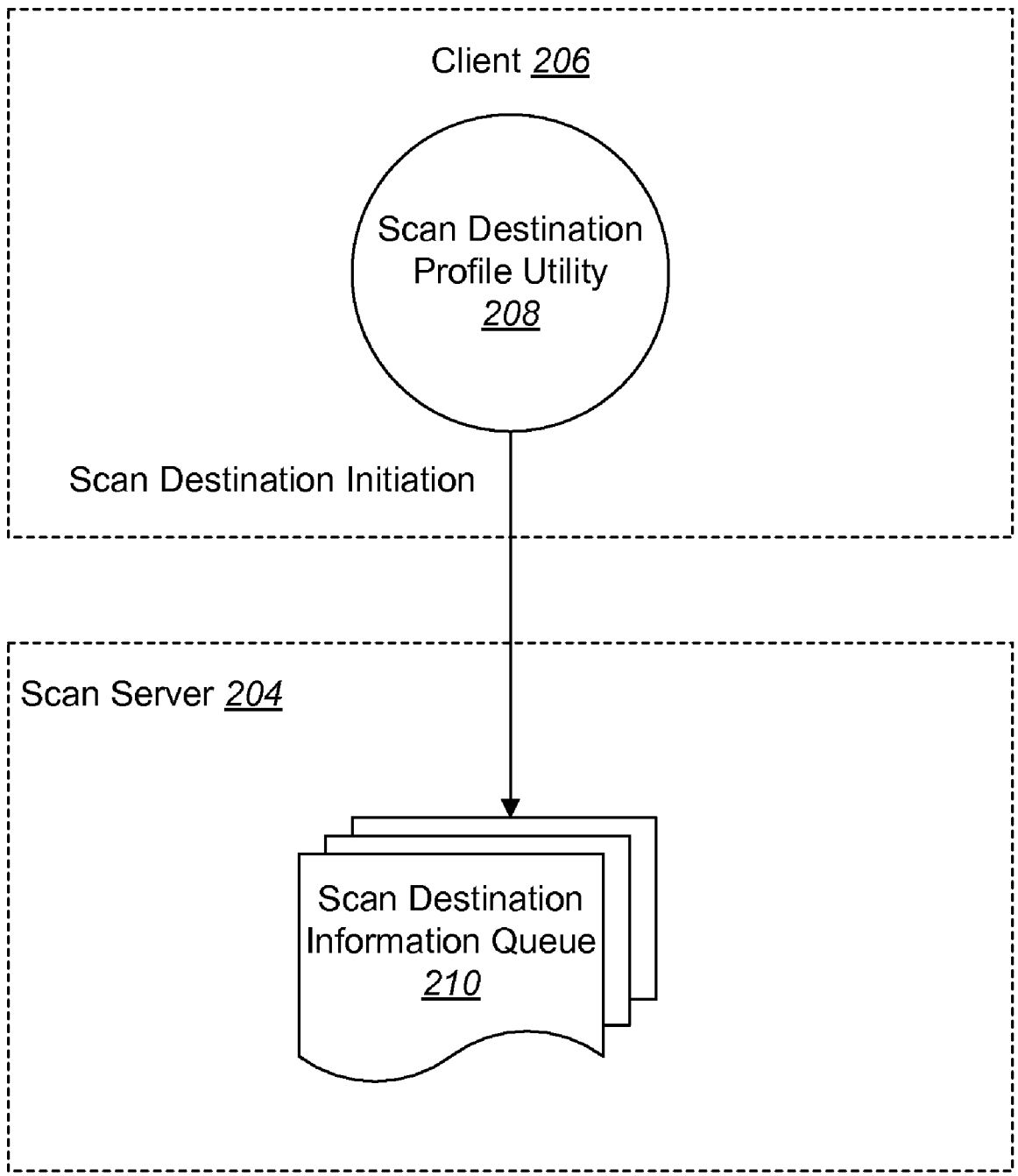
FIG. 2A illustrates some aspects of the operation of a scan destination profile application on a client destination in accordance with an embodiment.
Figure 2B:
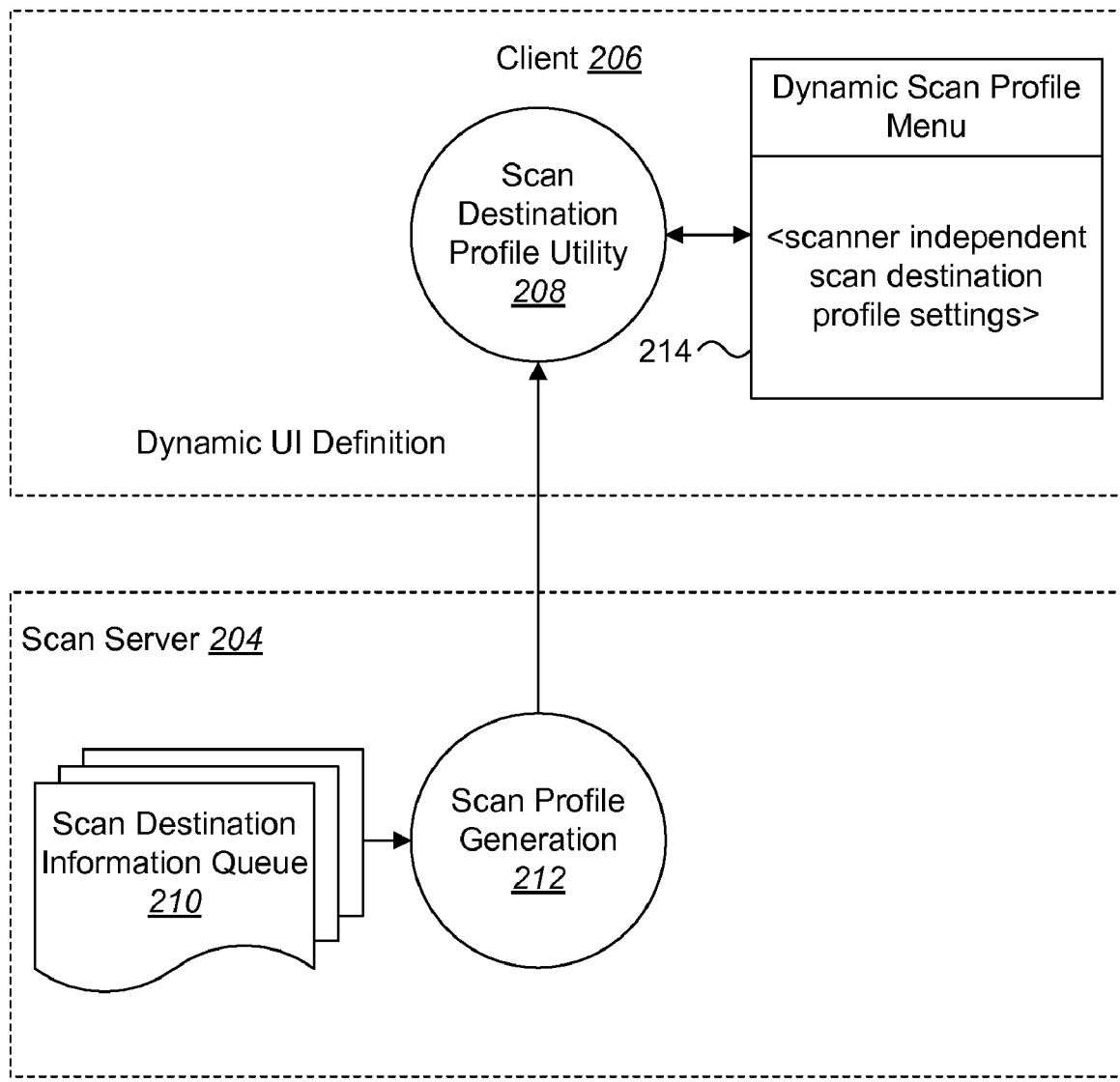
FIG. 2B illustrates some aspects of the operation of a scan profile generation process on a scan server in accordance with an embodiment.
Figure 2C:
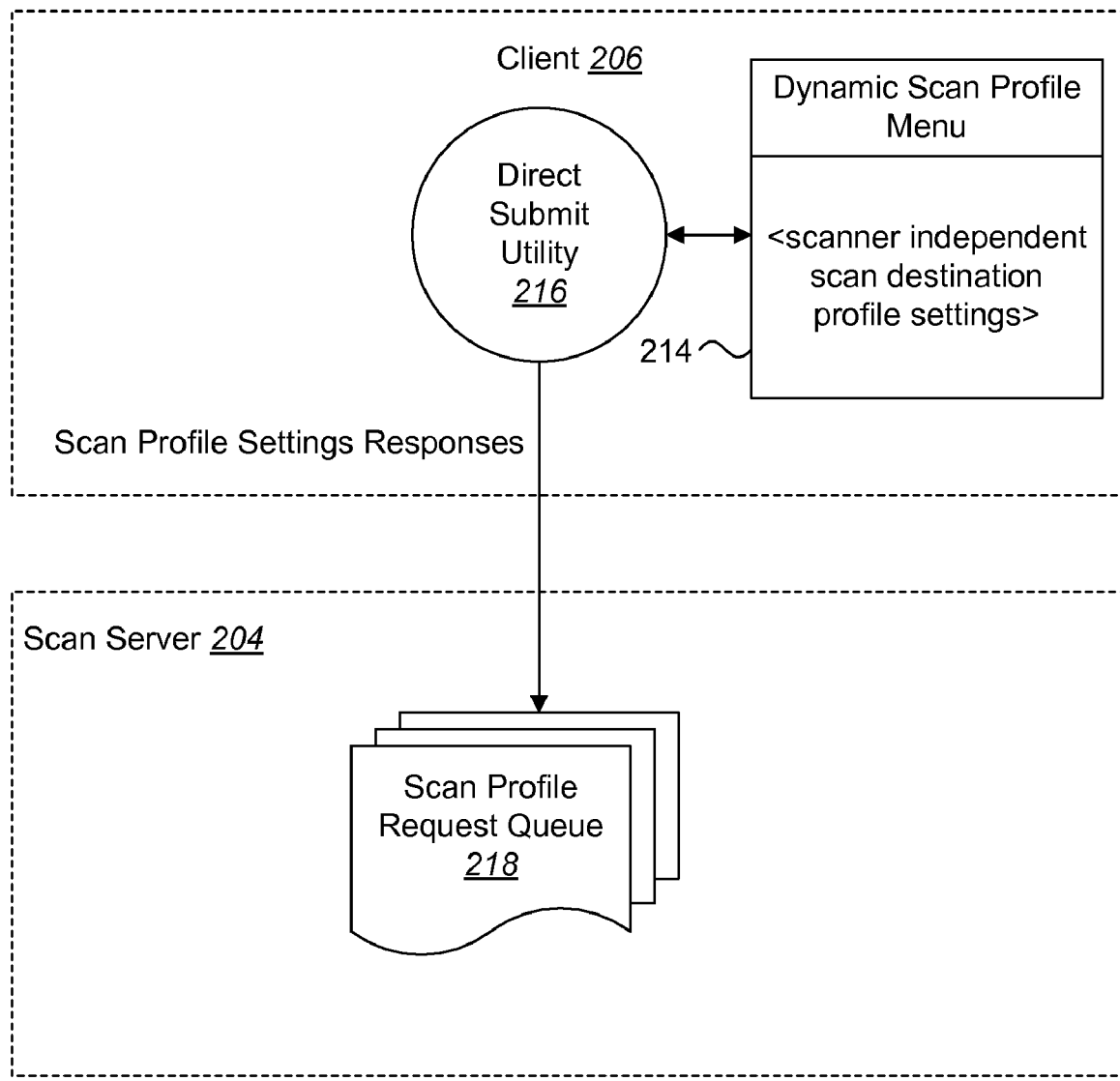
FIG. 2C illustrates some aspects of the operation of a direct submit utility on a client destination in accordance with an embodiment.

Referring now to FIGS. 2A-2C, in accordance with an embodiment a client 206 may include a scan destination profile (SDP) application 208. A user may operate the SDP application 208 to directly submit scan destination profiles in a scanner independent format to a scanner(s), scanner group(s) or scan server 204. The process may begin when the SDP application 208 sends a scan destination information request to the scan server 204. The request may optionally include the identification of the targeted scanner(s) or scanner group(s). The message may be in any format, such as HTTP, SOAP/XML, a proprietary format over TCP/IP, etc. The scan destination information request may then either be stored in a queue 210 on the scan server 204 or processed immediately.

In an alternative embodiment, the scan destination information request may be sent directly to one or more of the specified scanners 102. In this case, the scanner 102 may act as a proxy for the scan server 204, and may perform some or all of the actions of the scan server 204. Any actions not performed by the scanner 102 may then be forwarded to the scan server 204.

Upon receipt of the scan destination information request at the scan server 204, the scan server 204 may either process the request immediately (i.e., synchronously) or deferred (i.e., asynchronously). That is, in the later case, the request may be spooled and processed according to some spooling order (e.g., FIFO).

When the scan destination information request is processed by the scan server 204, a scan profile generation process 212 on the scan server 204 may generate a user interface (UI) definition for scanner independent scan destination profile settings. If no scanners were specified in the scan destination information request, the UI definition may also include a scanner selection. There are many ways that the scanners 102 may be identified, such as prior manual input by the device administrator, discovery using a management (SNMP) or service (Web Services) discovery protocol, accessing a service (e.g. Scanner Directory Service) to obtain a list of pre-registered devices, etc.

In the case of accessing a service to obtain a list of pre-registered devices, the device registration service may be hosted on one or more of the scanner devices 102 or on a different computing device. If the registration service is on a computing device, the scan profile generation process 212 may access the service either by direct communication with the scanner registration service, or by indirect communication with the scanner registration service (e.g., by making the request to the scanner 102, which may then forward the request to the scanner registration service).

When the registration service is on the scanner device 102, it may additionally be under the control of, or hosted by, a third party application. For example, the service may be a Java Applet which the controlling application downloads to the device 102, and which the device 102 runs as a guest process. As another example, the controlling application may register with the device 102 which message types it will process. Messages received by the device 102 (e.g., a list of available scanners), which are handled by the controlling application, may then be forwarded to the controlling application for interpretation and action. The controlling application may then send the responses (e.g., scanner list) directly back to the scan profile generation process 212, or to the device 102, which may then forward (and possibly reformat) the responses.

Once the scan profile generation process 212 on the scan server 204 has completed the UI definition, the scan server 204 may send the UI definition back to the SDP application 208. The UI definition may be in any suitable format. In accordance with an embodiment, the format may be conducive to rendering a UI, such as XML, HTML, XUL (XML Markup Language), XAML (Microsoft Avalon based markup/rendering language), etc. Any suitable communication channel and protocol may be used for sending the UI definition back to the SDP application 208, such as HTTP, SOAP, FTP, Network File System (NFS), a proprietary protocol over TCP/IP, AppleTalk, email, Remote Procedure Call (RPC), etc. The scan profile generation process 212 on the scan server 204 may additionally compress and/or encrypt the response or send the response over a secured communication channel (e.g., SSL, HTTPS).

In alternative embodiments, the scan destination information request may have been received by one of the specified scanners 102. In this case, the scanner 102 may act as a proxy for the scan server 204, whereby the scanner 102 may generate all of the UI definition, part of the UI definition, or none of the UI definition. In the later cases, the remaining portions of the UI definition may be generated by the scan server 204. For example, the scanner 102 may forward an unprocessed portion of the request to the scan server 204. Upon completion, the scan server 204 may then send the completed UI definition either directly back to the SDP application 208, or to the scanner 102, which may then forward the UI definition to the SDP application 208.

In another variation of this embodiment, the scanner 102 may be under the control of a third-party controlling application. In this case, the controlling application may control the processing of scan destination information requests from the queue 210 (e.g., scheduling/priority), dynamically validate the requests, dynamically provide a UI definition repository, etc. In the case where there is a controlling application, the controlling application may be registered with the scanner 102 by any suitable means, such as manual input through an administrative interface (e.g., key operator code on a front panel or an embedded web page), automatic registration by the controlling application through a programmatic registration interface on the device 102 (e.g., SOAP, HTTP, proprietary protocol over TCP/IP, etc.), discovery of the controlling application by the scanner/MFP 102 by a service discovery protocol (e.g., SLP, SSDP, Salutation, WS-Discovery, Microsoft UPnP, Sun Jini, Bluetooth, etc), and so forth. In some cases, registration of the controlling application may also be implemented by downloading a program that can execute on the scanner 102, such as an executable module that runs natively in the scanner 102, and/or a machine independent program that runs within a guest operating system (e.g., a Java Applet).

In another embodiment, where the scan destination information request does not include the specified scanners 102, the scan profile generation process 212 on the scan server 204 may additionally perform a best-fit search to determine one or more candidate scanners 102 to generate/upload a scan destination profile 122 to. The best-fit search may be based on any suitable algorithm. For example, the best-fit search may be based on the presence of a function or a sub-unit. This may be appropriate where the scan destination information request includes information on the imaging function (e.g., print, fax, file, scan, copy, convert, publish, etc.) and/or required sub-units (e.g., scanner, fax modem, filing storage, etc). Alternatively, or in addition, the best-fit search may be based on the availability of the scanner 102 (e.g., idle vs. busy). This may be appropriate where the scan destination information request includes information on the urgency of the job. Alternatively, or in addition, the best-fit search may be based on the performance of the scanner 102 (e.g., pages per minute). This may be appropriate where the scan destination information request includes information on the desired performance speed (or range) of the scanner(s) 102. Alternatively, or in addition, the best-fit search may be based on the locality of the scanner 102 (either physical or logical, e.g., by department). This may be appropriate where the scan destination information request includes information on the location of the client 206 or the desired location of the scanners 102. Alternatively, or in addition, the best-fit search may be based on access rights. This may be appropriate where the scan destination information request may include access rights information for identifying the scanners 102 on which the user has the authority to execute the desired function (e.g., scan, fax, etc).

Upon receipt of the response from the scan profile generation process 212 on the scan server 204, the scan destination profile (SDP) application 208 may then dynamically render a scanner independent scan destination profile UI dialog 214, according to the UI definition that was included in the response from the scan server 204. The settings in the scanner independent scan destination profile UI dialog 214 may include (but are not limited to) the selected scanner(s) or scanner group(s), the scanner input settings (e.g., resolution, cropping, image size), the output format settings (e.g., file format, compression, encryption, encoding), destination and delivery (e.g., FTP, email, HTTP, NFS, SOAP/XML), post-processing workflows (e.g., OCR, Bates stamping, watermarks, page numbering, indexing/archiving, 3D reconstruction), accounting (e.g., department code), security (e.g., PIN, encryption, etc), and so forth. The SDP application 208 may also perform some validation of the message format prior to rendering the UI dialog 214.

A user may select scanner independent scan destination profile settings from the UI dialog 214. A direct submit utility 216 may be used to send a scan destination profile request to the scan server 204. The scan destination profile request may include the settings that were selected from the UI dialog 214. The scan destination profile request may be stored in a scan profile request queue 218.

In an alternative embodiment, if a scanner 102 has been acting as a proxy to the scan server 204, the responses may be sent back to the scanner 102, which may then forward the responses (either entirely or partially) back to the scan server 204. In another variation, the communication address of the scan server 204 may have been sent back to the SDP application 208 as part of the UI definition. In this case, the SDP application 208 may send the UI responses directly back to the scan server 204.

Figure 3A:
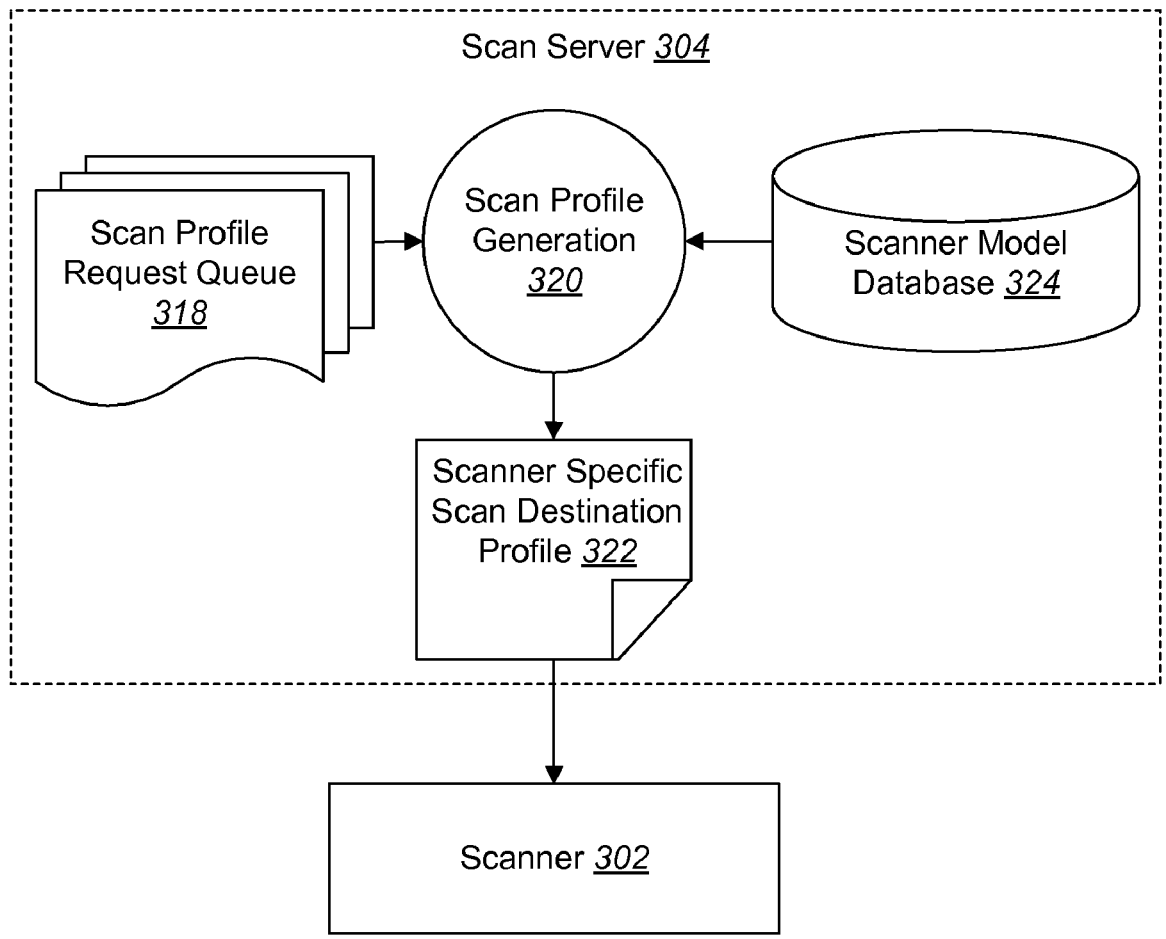
FIG. 3A illustrates some aspects of the operation of a scan profile generation process on a scan server in accordance with an embodiment.
Figure 3B:
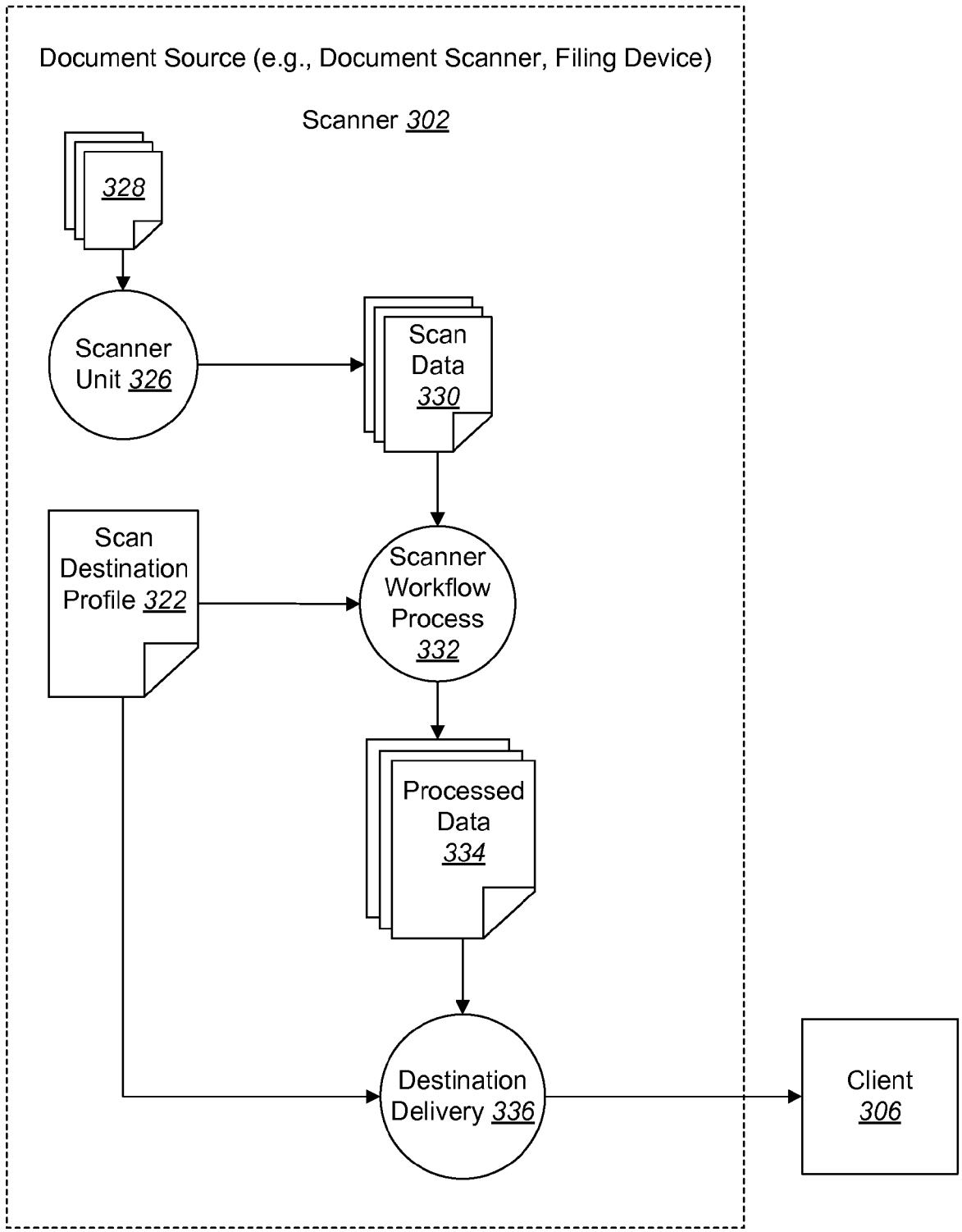
FIG. 3B illustrates some aspects of the operation of a scanner unit and a scanner workflow process on a scanner in accordance with an embodiment.

Referring now to FIGS. 3A-3B, a scan profile generation 320 process on a scan server 304 may process scan destination profile requests from a scan destination profile request queue 318. The processing of these requests may be asynchronous to the receiving of the requests. In an alternative embodiment, the priority, scheduling and releasing of scan destination profile requests for processing may be under the control of an external controlling application, as discussed earlier.

The scan profile generation process 320 on the scan server 304 may start processing the scan destination profile requests at any time. In one case (e.g., push), a scan destination profile request may include a list of scanner(s) 302, or scanner group (s), to upload a scan destination profile to. In another case (e.g., pull), the request may not include the specified scanner (s) 302. Instead, the processing may be deferred until a scanner 302 makes a request for the scan destination profile.

When the scan profile generation process 320 on the scan server 304 starts processing a scan destination profile request, it may determine whether all of the scanner independent scan destination profile settings within the request are supported by each of the specified scanners 302 and/or output destinations 306. In an embodiment, this determination may be made by parsing the request to identify all scan destination profile options/settings, querying either the physical scanner 302 or a scanner model definition database (SMDB) 324 regarding whether the scanner 302 supports the associated scanner options/settings, and querying either the destination 306 or a destination information repository regarding whether the destination 306 supports the associated destination option/settings (e.g., workflows).

A scanner model database 324 may include definitions of the capabilities, options and settings for some predetermined set of scanner 302 types or models. A query may be made by specifying the scanner's 302 type or model (which may be obtained from, e.g., an SNMP query of the scanner 302) as the primary key, and then the specified options/settings as the secondary keys.

If the scanner 302 supports all the scanner-side options/settings that are included in the scan destination profile request, and the destination 306 supports all the destination-side options/settings that are included in the scan destination profile request, then the scan profile generation process 320 on the scan server 304 may convert the scanner independent scan destination profile into a format that is native to the scanner 302. The conversion from the scanner independent format to the scanner dependent format may be accomplished using the SMDB 324. In this case, the SMDB 324 may have a mapping of the scanner options/settings from the scanner independent format to the scanner specific format. In the case where some of the options/settings are destination specific and not known by the scanner 302 (e.g., metadata that is passed straight through by the scanner 302 without interpretation), these options may be converted using the destination information repository, instead of the SMDB 324. In another mode, the definitions for the conversion may be embedded in the scanner device 302. The scanner 302 may be queried for the conversions, or the conversion definitions may be uploaded from the scanner 302.

Once the scanner specific scan destination profile 322 is completed, the scan destination profile 322 may be uploaded to the scanner 302. In an embodiment, the scan destination profile 322 may be uploaded immediately. Alternatively, the scan destination profile 322 may be queued for uploading. Alternatively still, the scan destination profile 322 may be deferred until there is a request from the scanner 302 or another release event. The uploading of the scan destination profile 322 to the scanner device 302 may be by any means that is supported by the scanner device 302 (e.g., HTTP, FTP, email, etc).

In another embodiment, the scanner destination profile conversion may occur on another computing device. The remote conversion device may be known by the scan server 304 by any means, such as manual input through an administrative interface (e.g., key operator code on a front panel or an embedded web page), automatic registration by the conversion device through a programmatic registration interface on the device (e.g., SOAP, HTTP, proprietary protocol over TCP/IP, etc.), or discovery of the conversion device by means of a service discovery protocol (e.g., SLP, SSDP, Salutation, WS-Discovery, Microsoft UPnP, Sun Jini, Bluetooth, etc). The conversion request may be sent to the remote conversion device by any suitable means and format, such as those described earlier.

Once the scan destination profile 322 is uploaded to the scanner 302, the user may initiate a scan-to-destination job (e.g., scan-to-FTP, fax, scan-to-filing) using the scan destination profile 322. Because the profile 322 may be fully native to the scanner 302 and destination 306, all the scanner-side processing may be performed on the scanner 302, the resultant scanned image data may be sent directly to the destination 306, and all destination-side processing may be performed by the destination 306. For example, a scanner unit 326 may scan a document source 328, thereby producing scan data 330. The scan data 330 and the scan destination profile 322 may be provided to a scanner workflow process 332 on the scanner 302, which may generate processed data 334. The processed data 334 may be provided to a destination delivery process 336, which may deliver the processed data 334 to its intended destination 306. Additional destination-side processing may occur on the destination 306, or on an intermediate destination (not shown).

Figure 4A:
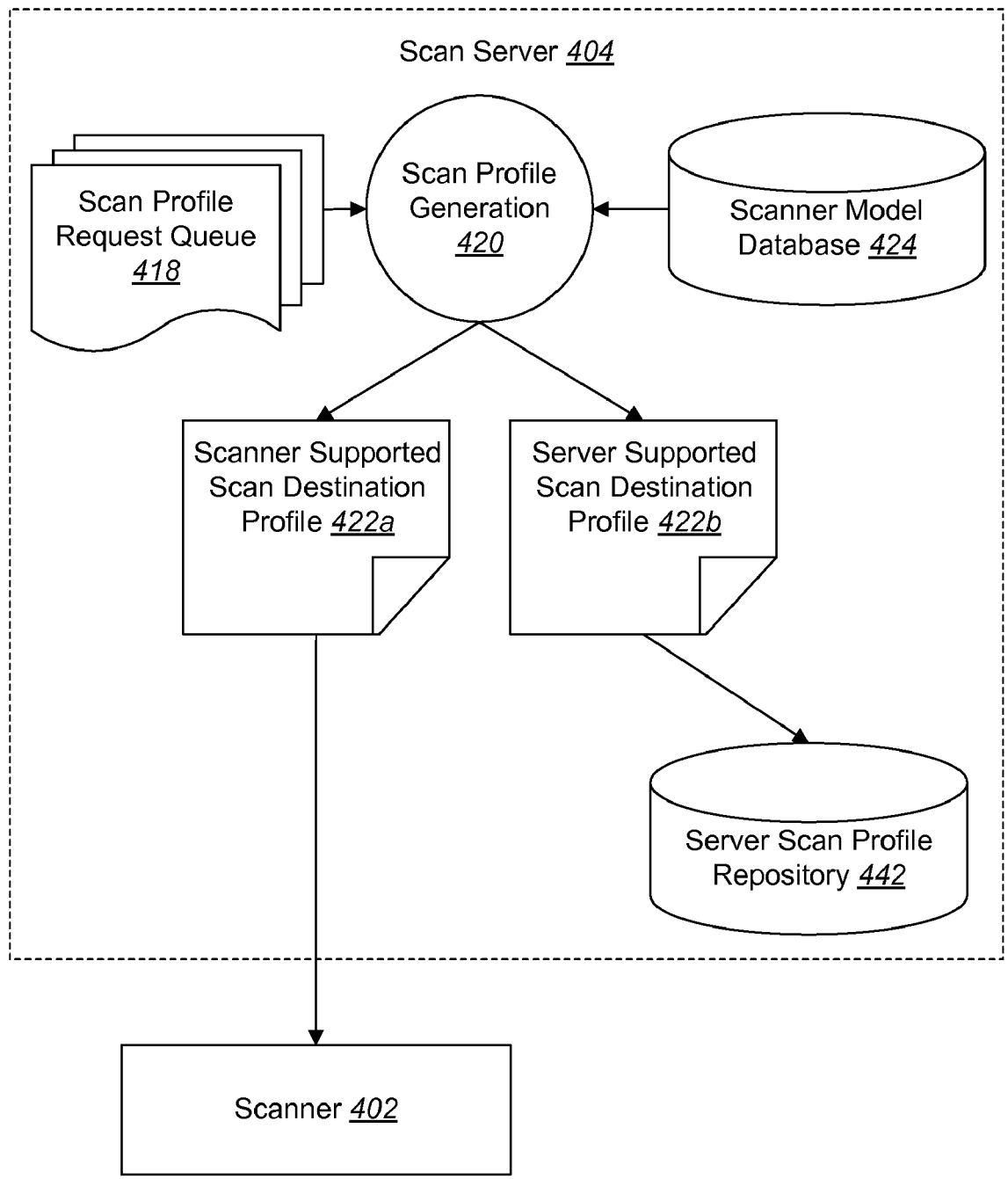
FIG. 4A illustrates some additional aspects of the operation of a scan profile generation process in accordance with an embodiment.
Figure 4B:
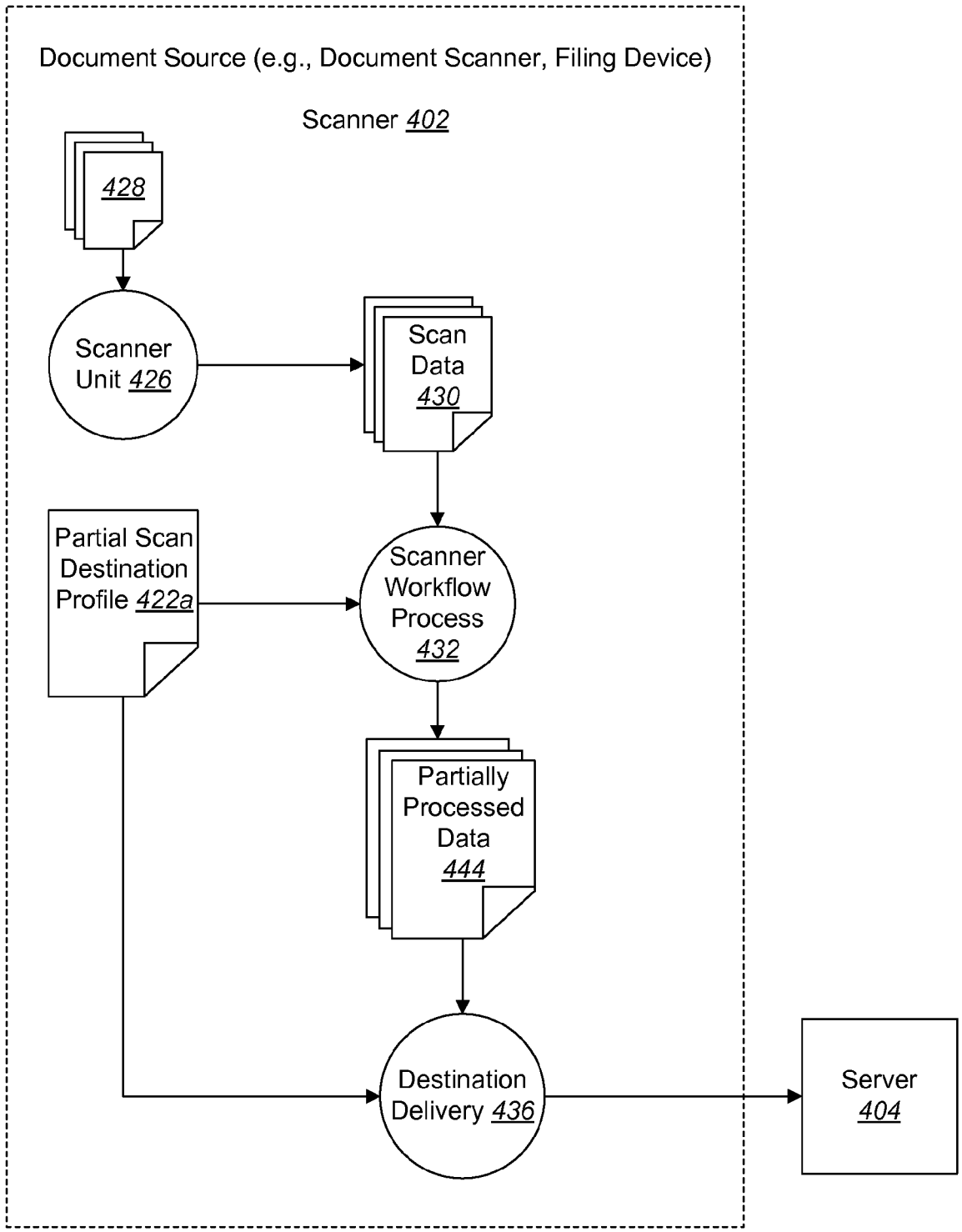
FIG. 4B illustrates some additional aspects of the operation of a scanner unit and a scanner workflow process on a scanner in accordance with an embodiment.
Figure 4C:
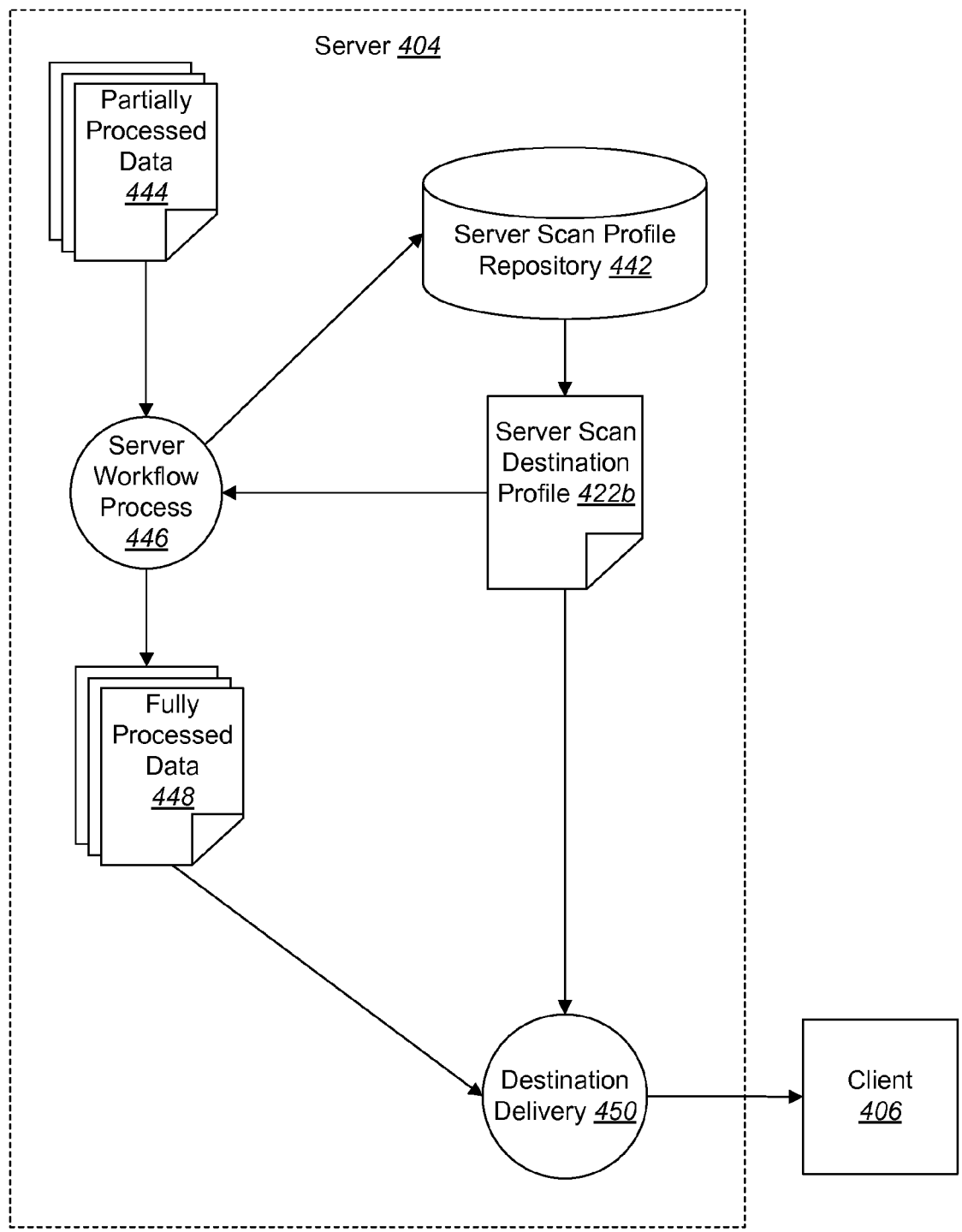
FIG. 4C illustrates some aspects of the operation of a server workflow process and a destination delivery process on a server in accordance with an embodiment.

Referring now to FIGS. 4A-4C, if a scanner 402 does not support all of the options/settings of a scan destination profile request, the scan server 404 may split the scanner independent scan destination profile into two parts: a first part 422*a* and a second part 422*b*. The first part 422*a* may include the settings where the initial processing subset of scanner side settings are supported natively by the scanner 402, and where the final processing subset of destination side settings are supported natively by the destination 406. The second part 422*b* may include the unsupported scanner-side and destination-side settings.

The first part 422*a* may then be converted into a format that is specific to the scanner 402 (native), as described earlier, with the exception that the output destination of the profile 422*a* may be redirected to the scan server 404 or other computing device capable of performing the unsupported scan/destination processing options/settings. The second part 422*b* may then be converted to a format that is compatible with the scan server 404 (non-native) or other computing device capable of performing the unsupported scan/destination processing options/settings. In an embodiment, if the scan server 404 or other computing device is already compatible with the scanner independent scan destination profile format, then it may be that no conversion occurs. Additionally, the output destination of the second part 422*b* of the scan destination profile may be set to the original destination of the scan destination profile.

If the second part 422*b* of the profile is executed on another computing device, the scan server 404 may send the second part 422*b* of the scan destination profile either immediately, or after a delay (e.g., such as by a pull request from the other computing device). The second part 422*b* of the scan destination profile may be sent to the other computing device by any suitable means, such as those described earlier. The scan server 404 or other computing device may then save the second part 422*b* in a scan destination repository 442, which may be local or external to the server 404 or device.

There are a variety of ways that the scan server 404 may connect (e.g., link) the first and second parts 422*a*, 422*b* of the scan destination profile. For example, the output destination on the scan server 404, or computing device, may be a specific port address that is associated with the second part 422*b* of the scan destination profile. As another example, the output destination on the scan server 404, or computing device, may be a specific file path (e.g., FTP, NFS) that is associated with the second part 422*b* of the scan destination profile. As another example, the output destination on the scan server 404, or computing device, may be a specific email address associated with the second part 422*b* of the scan destination profile. As another example, metadata may be embedded in scanned image data 430 that is output by a scanner unit 426 within the scanner 402, and the metadata may contain an identifier that is associated with the second part 422*b* of the scan destination profile. As another example, the second part 422*b* of the scan destination profile may be derived from other information that may be obtainable from the scanned image output and delivery mechanism, such as the device name, user ID, input document name or type, and/or profile name.

Once the first part 422*a* of the scan destination profile is uploaded to the scanner 402, the user may initiate a scan-to-destination job using the scan destination profile. In an embodiment, if the original scan destination profile is not fully native to the scanner 402 and/or destination 406, the subset of scanner-side processing settings (as specified in the profile) may be executed on the scanner 402. In particular, a scanner unit 426 may scan a document source 428, thereby generating scan data 430. The scan data 430 may be provided to a scanner workflow process 432, which may process the scan data 430 according to the first part 422*a* of the scan destination profile, thereby generating partially processed data 444. The partially processed scan data 444 may be sent by a destination delivery unit 436 to the scan server 404, or computing device (as may be specified in the profile).

The scan server 404, or computing device, may perform the remaining unsupported scanner-side settings and the initial unsupported destination side (e.g., workflow) post-processing (as specified in the scan server's scan destination profile 422*b*). In particular, the partially processed scan data 444 provided by the scanner 402 may be provided to a server workflow process 446. The server workflow process 446 may process the partially processed scan data 444 in accordance with the second part 422*b* of the scan destination profile, thereby generating fully processed scan data 448. A destination delivery unit 450 within the scan server 404, or computing device, may then send the fully processed scan data 448 to the destination 406 by some means that is supported by the destination 406. The destination 406 may then perform any remaining destination side post-processing.

In accordance with an embodiment, the scan server 404 may reorder the steps in a manner where the final steps are supported by the destination 406, even though a step performed by the scan server 404 may have otherwise been supported by the destination 406. The processing specified by the scan server 404 and/or computing device's portion 422*b* of the scan destination profile may also be distributed across other devices that can perform the services. These devices/services may be identified by any means, such as prior manual entry by an operator, a service discovery method (e.g., SLP, SSDP), a service registration method, etc.

In some cases, the format of the scanned image data 444, 448 that is received and/or processed by the scan server 404 (or other computing device) may not be in a format that is compatible as input to the destination side 406. In this case, the scan server 404 may convert the output format into an input format that is compatible with the destination side 406. The conversion may be performed either by the scan server 404 and/or computing device or a remote conversion device. In an embodiment, when a conversion is to occur, the converting device may initiate the conversion as follows. The document/image data may be extracted from the received data. The format of each document/image may be determined. The device may then determine if the conversion can be done by a direct format-to-format conversion (e.g., transcoder). Otherwise, the conversion may be done by using a format specific application that supports the printing of the document/image data (i.e., is able to convert the native format of the document into device-independent graphical primitives, such as GDI in MS-Windows).

When the conversion can be done by a direct format-to-format conversion, the extracted document/image data may be passed to the conversion utility. Once converted, the converted data may then be placed back into the received data at the appropriate location. Otherwise, the conversion may be done by loading the document/image into the application that supports the document/image data and requesting that the application does a background print of the document to a specified logical printer. In this case, the logical printer may include a format-specific generic printer driver, which may convert the device independent graphical primitives (e.g., GDI) into the specified format (e.g., TIFF, PDF, etc). The driver may be referred to as a generic driver, because the driver may not generate any control sequences relating to how the targeted destination may render and output (e.g., duplex, staple, etc) the converted data. In another mode, the driver may be a device specific driver. In this case, a post-process may be executed which filters the device specific settings from the converted data.

Once converted, the converted data may then be placed back into the received data at the appropriate location. The scan server 404 (or computing device) may then send the partially (or fully) processed scanned image data 448 to the destination 406 originally specified. The destination 406 may then complete any remaining post-processing (e.g., workflows), if any, of the scanned image data 448.

Figure 5:
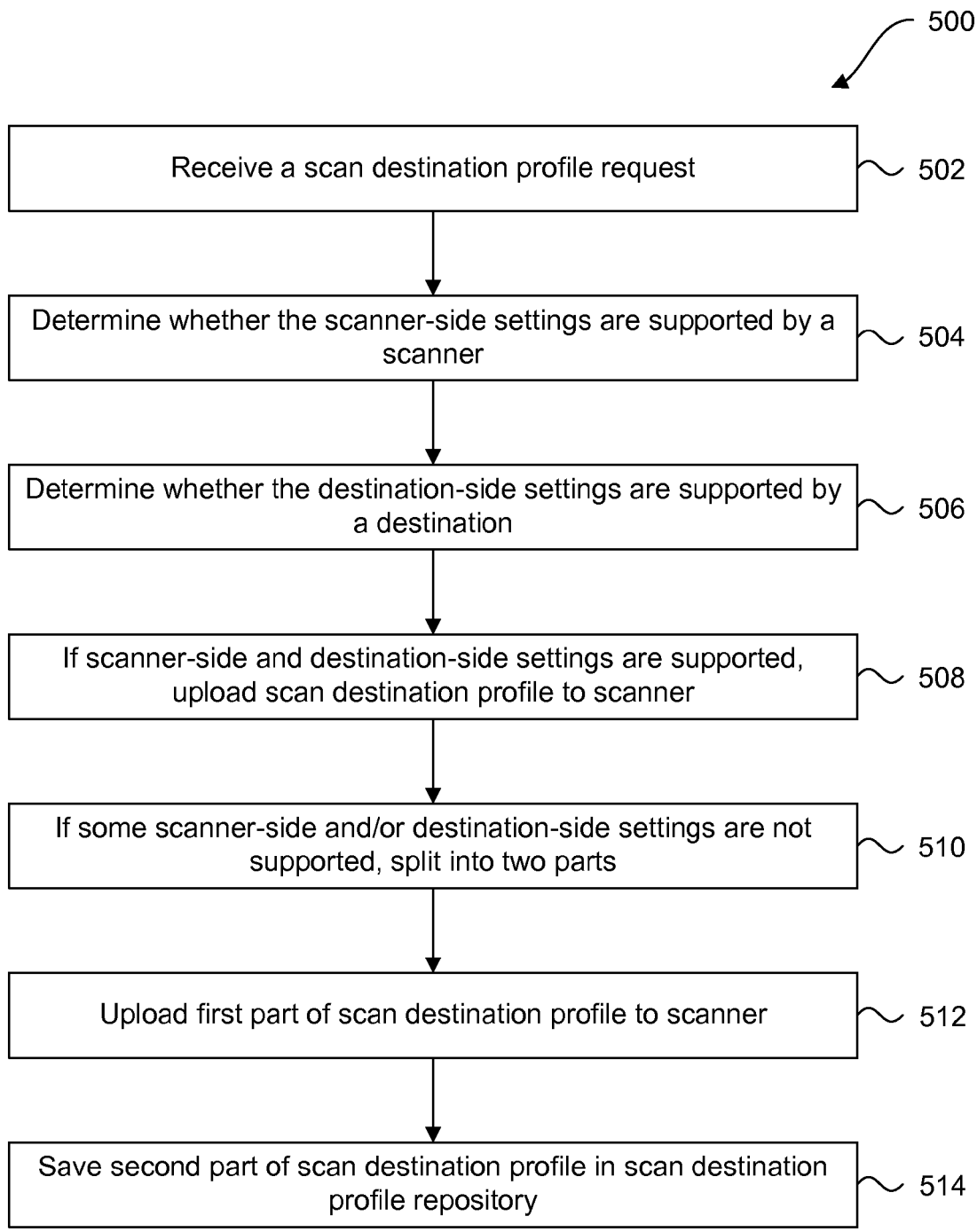
FIG. 5 illustrates a method for facilitating direct scanning to network destinations by thin clients in accordance with an embodiment.

FIG. 5 illustrates a method 500 for facilitating direct scanning to network destinations by thin clients in accordance with an embodiment. The method 500 may be implemented by a scan server 104.

The scan server 104 may receive 502 a scan destination profile request. The scan destination profile request may include scanner-side settings and destination-side settings. The scanner-side settings may include scanner settings (e.g., resolution, image size), output formats (e.g., file type, compression, encoding, encryption), and the like. The destination-side settings may include post-processing workflows (e.g., OCR, indexing, Bates stamping, 3D reconstruction), and so forth.

The scan server 104 may determine 504 whether the scanner-side settings are supported by a scanner 102 that may be specified in the scan destination profile request. This may involve querying the scanner 102. Alternatively, this may involve querying a scanner model definition database.

The scan server 104 may also determine 506 whether the destination-side settings are supported by a destination 106, such as the destination 106 that sent the scan destination profile request. This may involve querying the destination 106. Alternatively, this may involve querying a destination information repository. If the scan server 104 determines 508 that the scanner-side and destination-side settings are supported, the scan destination profile may be uploaded 508 to the scanner 102. When a user subsequently selects the scan destination profile 122, the scanned image data may be processed natively on the scanner and sent directly (i.e., without going through the scan server 104) to the destination 106, where it may be further processed (i.e., workflow).

If the scan server 104 determines 508 that some scanner-side settings are not supported by the scanner 102 and/or some destination-side settings are not supported by the destination 106, the scan server 104 may split 510 the scan destination profile into two parts, a first part 422a and a second part 422b. The first part 422a of the scan destination profile may include the scanner-side settings that are supported by the scanner 102. The second part 422b of the scan destination profile may include the scanner-side settings that are not supported by the scanner 102 and the destination-side settings that are not supported by the destination 106.

The first part 422a of the scan destination profile may then be converted to a format that is compatible with the specified scanner 102 (if it is not already in such a format), with the exception that the output destination of the first part 422a of the scan destination profile may be set to the scan server 104. The converted first part 422a of the scan destination profile may then be uploaded 512 to the specified scanner 102. The second part 422b of the scan destination profile may then be converted to a format which is interpretable by the scan server 104 (if it is not already in such a format), with the output destination of the second part 422b of the scan destination profile being set to the original output destination 106. The second part 422b of the scan destination profile may be saved 514 in a scan destination profile repository 442, which may be located on the scan server 104 or elsewhere.

When a user subsequently selects the scan destination profile, the scanned image data may be partially processed natively on the scanner 102 according to the first part 422a of the scan destination profile and then sent to the scan server 104 (or other computing device). The scan server 104 may then continue the processing of the scanned image data according to the second part 422b of the scan destination profile and send the processed scanned image data to the original destination 106, where it may be further processed by a destination native workflow process.

While the above embodiments have described as using a scan destination profile, other embodiments may include a pull scan, where the scan destination profile is for a single use. Other embodiments may include other remote input imaging operations that render an output and transmit the output to another destination, such as an outbound or inbound fax, a file retrieval, a format conversion, etc. Other embodiments may include the scan server monitoring or receiving job status/completion notifications from the scanning device, and converting the notifications to a format compatible with the SDP application, and forwarding the converted job status/completion notifications to the SDP application.

Figure 6:
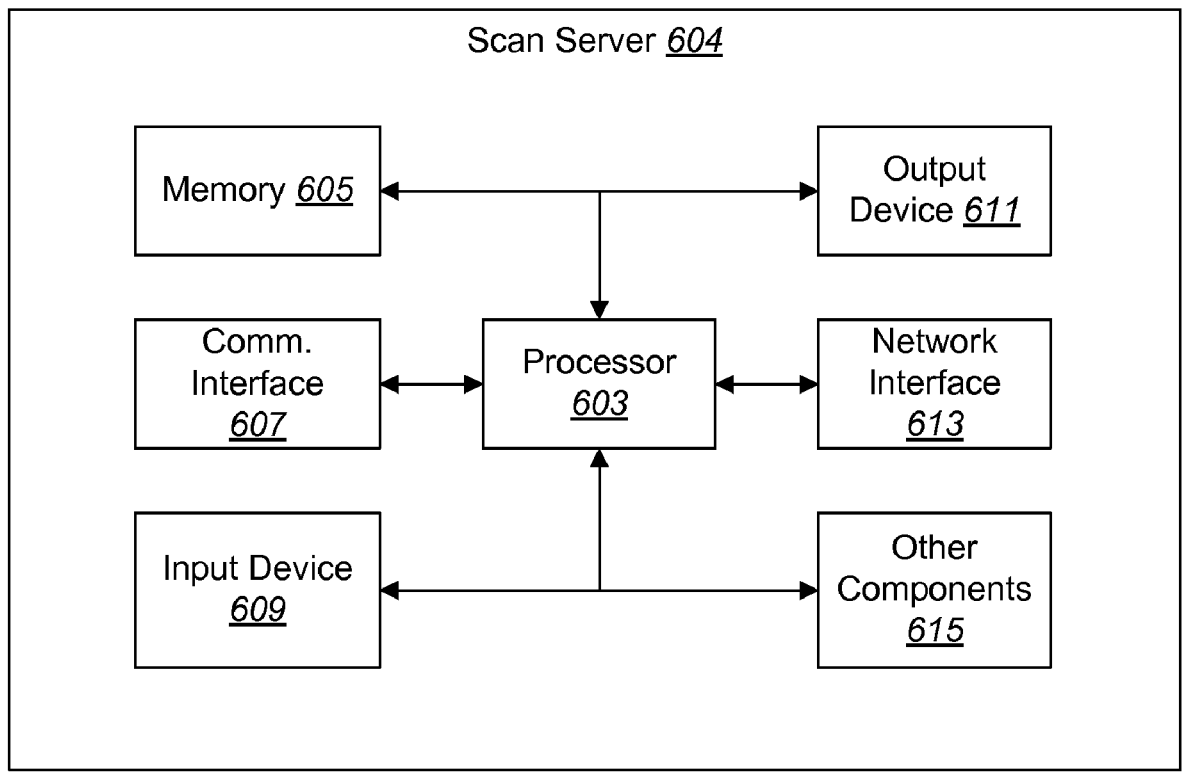
FIG. 6 illustrates various components that may be utilized in a scan server in accordance with an embodiment.

FIG. 6 illustrates various components that may be utilized in a scan server 604 in accordance with an embodiment. The illustrated components may be located within the same physical structure or in separate housings or structures.

The scan server 604 may include a processor 603 and memory 605. The processor 603 may control the operation of the scan server 604 and may be embodied as a microprocessor, a microcontroller, a digital signal processor (DSP) or other device known in the art. The processor 603 typically performs logical and arithmetic operations based on program instructions stored within the memory 605. The instructions in the memory 605 may be executable to implement the methods discussed above. For example, the processor 603 may execute the instructions in the memory 605 to perform the steps of the method 500 of FIG. 5, such as receiving 502 a scan destination profile request, determining 504 whether the scanner-side settings are supported by a scanner 102, determining 506 whether the destination-side settings are supported by a destination 106, and so forth.

The scan server 604 may also include one or more communication interfaces 607 and/or network interfaces 613 for communicating with other electronic devices, such as a scanner 102, a client destination 106, etc. For example, the scan server 604 may receive a scan destination profile request from a client destination 106 via the communication interface 607 or via the network interface 613. As another example, the scan server 604 may receive partially processed scan data from a scanner 602 via the communication interface 607 or via the network interface 613. The communication interface(s) 607 and the network interface(s) 613 may be based on wired communication technology, wireless communication technology, or both.

The scan server 604 may also include one or more input devices 609 and one or more output devices 611. The input devices 609 and output devices 611 may facilitate user input. Other components 615 may also be provided as part of the scan server 604.

FIG. 6 illustrates only one possible configuration of a scan server 604. Various other architectures and components may be utilized in accordance with the disclosed embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for facilitating direct scanning to network destinations by clients, the method being implemented by a scan server, the method comprising:
receiving a scan destination profile request that comprises scanner-side settings;
determining whether the scanner-side settings are supported by a scanner;
if it is determined that at least some of the scanner-side settings are not supported by the scanner, splitting a scan destination profile into a first part and a second part, wherein the first part of the scan destination profile comprises the scanner-side settings that are supported by the scanner, and wherein the second part of the scan destination profile comprises the scanner-side settings that are not supported by the scanner; and
uploading the first part of the scan destination profile to the scanner.

2. The method of claim 1, wherein determining whether the scanner-side settings are supported by the scanner comprises at least one of querying the scanner and querying a scanner model definition database.

3. The method of claim 1, wherein the scan destination profile request further comprises destination-side settings, and further comprising determining whether the destination-side settings are supported by a client destination.

4. The method of claim 3, wherein determining whether the destination-side settings are supported by the client destination comprises at least one of querying the client destination and querying a destination information repository.

5. The method of claim 3, wherein the second part of the scan destination profile further comprises the destination-side settings that are not supported by the client destination.

6. The method of claim 1, further comprising setting the scan server as an output destination of the first part of the scan destination profile.

7. The method of claim 1, further comprising setting a computing device other than the scan server as an output destination of the first part of the scan destination profile, wherein the computing device supports the scanner-side settings in the second part of the scan destination profile.

8. The method of claim 1, further comprising converting the first part of the scan destination profile from a scanner independent format into a format that is compatible with the scanner.

9. The method of claim 1, further comprising converting the second part of the scan destination profile from a scanner independent format into a format that is compatible with the scan server.

10. The method of claim 1, wherein the scan destination profile request specifies the scanner.

11. The method of claim 1, further comprising saving the second part of the scan destination profile in a scan destination profile repository.

12. The method of claim 1, further comprising:
receiving partially processed scan data from the scanner, wherein the partially processed scan data has been processed according to the first part of the scan destination profile; and
performing additional processing on the partially processed scan data according to the second part of the scan destination profile, thereby generating scan server-processed scan data.

13. The method of claim 12, further comprising sending the scan server-processed scan data to a client destination.

14. The method of claim 1, further comprising:
receiving a scan destination information request from a scan destination profile application on a client destination;
generating a user interface definition for scanner independent scan destination profile settings; and
sending the user interface definition to the scan destination profile application.

15. The method of claim 14, wherein the scan destination information request comprises a scanner selection.

16. The method of claim 14, wherein the scan destination information request does not comprise a scanner selection, and further comprising performing a best-fit search to determine one or more candidate scanners.

17. A computer system that is configured to facilitate direct scanning to network destinations by clients, the computer system comprising:
a processor;
memory in electronic communication with the processor;
instructions stored in the memory, the instructions being executable to:
receive a scan destination profile request that comprises scanner-side settings;
determine whether the scanner-side settings are supported by a scanner;
if it is determined that at least some of the scanner-side settings are not supported by the scanner, split a scan destination profile into a first part and a second part, wherein the first part of the scan destination profile comprises the scanner-side settings that are supported by the scanner, and wherein the second part of the scan destination profile comprises the scanner-side settings that are not supported by the scanner; and
upload the first part of the scan destination profile to the scanner.

18. A non-transitory computer-readable medium comprising executable instructions for facilitating direct scanning to network destinations by clients, the instructions being executable by a scan server to cause the scan server to perform actions comprising:
receiving a scan destination profile request that comprises scanner-side settings;
determining whether the scanner-side settings are supported by a scanner;
if it is determined that at least some of the scanner-side settings are not supported by the scanner, splitting a scan destination profile into a first part and a second part, wherein the first part of the scan destination profile comprises the scanner-side settings that are supported by the scanner, and wherein the second part of the scan destination profile comprises the scanner-side settings that are not supported by the scanner; and
uploading the first part of the scan destination profile to the scanner.

* * * * *